Figure 1:
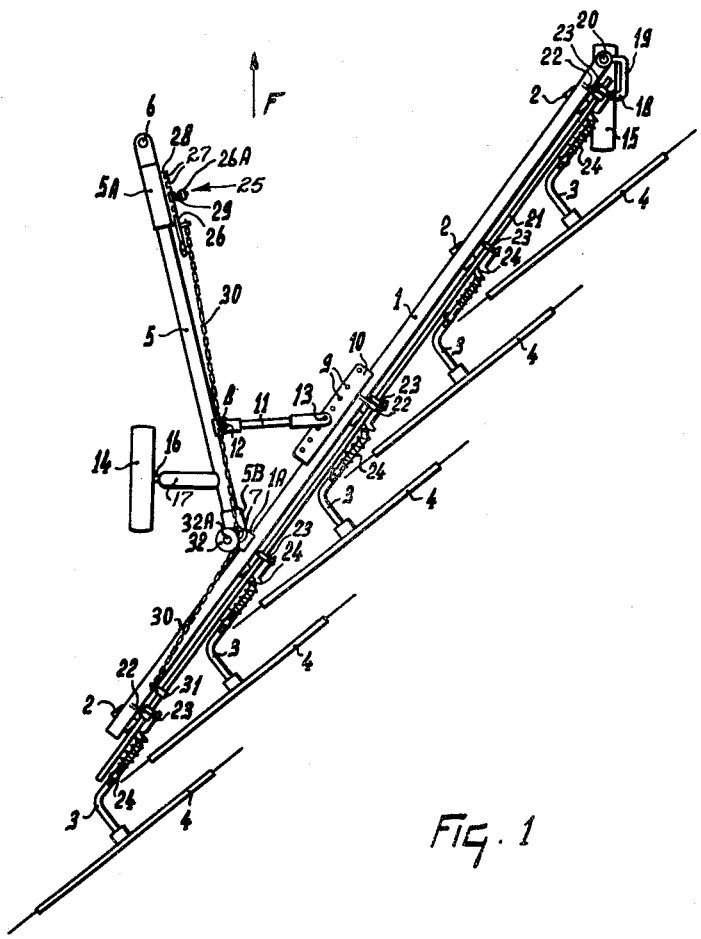

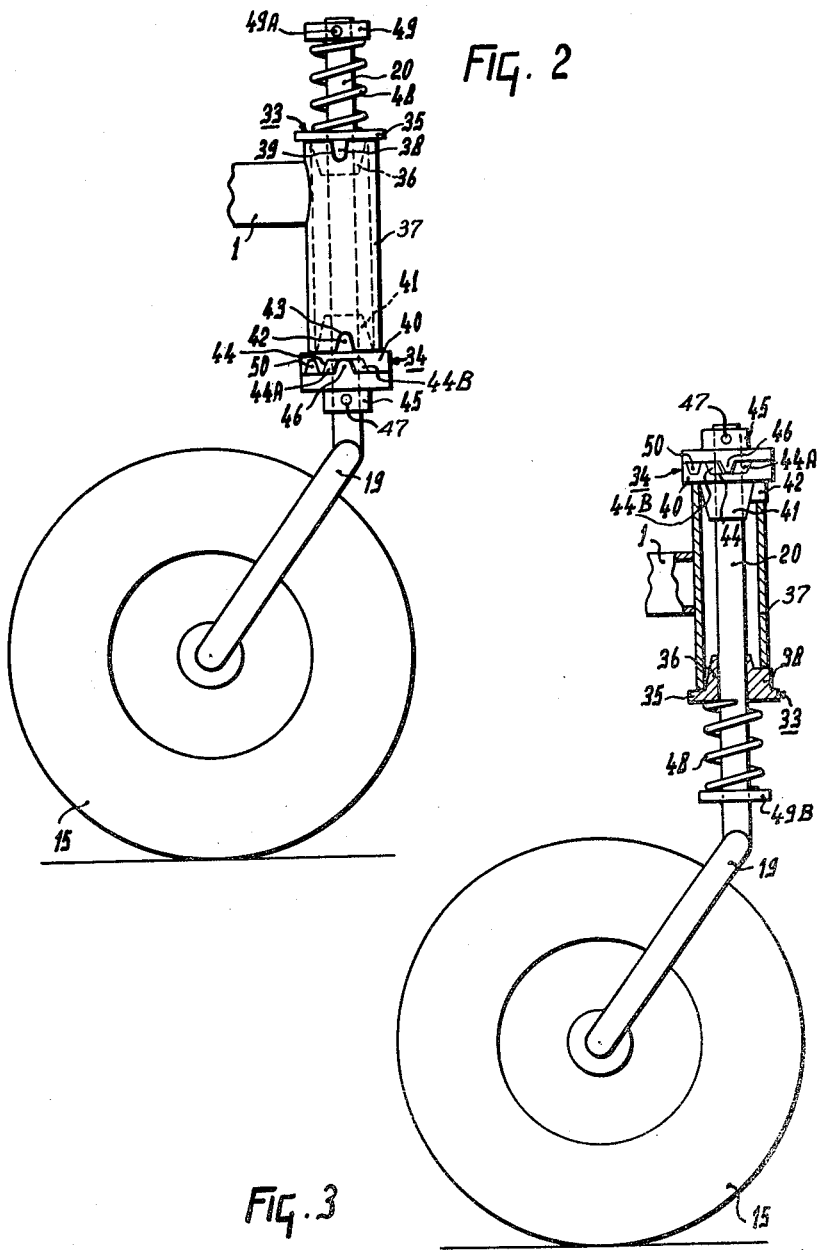

_United States Patent Office_

3,176,457
Patented Apr. 6, 1965

3,176,457
IMPLEMENTS FOR LATERALLY DISPLACING CROP LYING ON THE GROUND
Cornelis van der Lely, Zug, Switzerland, assignor to C. van der Lely N.V., Maasland, Netherlands, a Dutch limited-liability company
Filed Nov. 8, 1960, Ser. No. 68,044
Claims priority, application Netherlands, Nov. 10, 1959, 245,220
16 Claims. (Cl. 56—377)

This invention relates to an implement for laterally displacing crop lying on the ground, the implement being of the kind having a row of rake wheels mounted on a frame, the frame being adapted to be moved over the ground, and the rake wheels to be rotated during such movement, the rake wheels engaging the crop and displacing it laterally. Such an implement will be referred to hereinafter as "an implement of the kind set forth."

According to a first aspect of the present invention, there is provided an implement of the kind set forth, wherein the frame includes a first frame member on which the rake wheels of the row are mounted, and a second frame member in the form of a draw-bar connected to said first frame member so as to be movable in a horizontal or substantially horizontal plane, and to be fixable in a number of positions, with respect to said first frame member, and wherein the frame is supported by at least first and second ground wheels, said first ground wheel being mounted on the draw-bar so as to be movable horizontally therewith.

According to a second aspect of the present invention, there is provided an implement of the kind set forth, wherein the frame includes a first frame member on which the rake wheels of the row are mounted, and a second frame member in the form of a draw-bar connected to said first frame member so as to be movable about a vertical or substantially vertical axis, and to be fixable in a number of positions, with respect to said first frame member, and wherein lifting means to provided on said first frame member for lifting the rake wheels, a control mechanism for such lifting means being mounted on the draw-bar, the control mechanism being connected to the lifting means by a coupling element which is guided through an angle by a guide member located near said axis.

This invention relates further to an agricultural implement having a frame supported by at least one caster ground wheel.

According to the present invention, there is provided an agricultural implement having a frame supported by at least one caster ground wheel which is turnable about a vertical or substantially vertical axis with respect to the frame, wherein a stop mechanism is provided which limits angular movement of the caster ground wheel about its vertical or substantially vertical axis to an extent of less than 180°.

For a better understanding of the invention and to show how the same may be carried into effect, reference will now be made by way of example to the accompanying drawings, in which:

FIGURE 1 is a plan of an implement for laterally displacing crop lying on the ground, FIGURE 2 is, on an enlarged scale, a side elevation of a first embodiment of a part of the implement, and FIGURE 3 is, on an enlarged scale, a part-sectional side elevation of a second embodiment of the part shown in FIGURE 2.

As shown in FIGURE 1 the implement has a frame including a main frame beam 1, to which are secured five bearing sleeves 2. Cranks 3 are turnably mounted in the bearing sleeves, and rake wheels 4 are in turn freely rotatably mounted on the free ends of the cranks. The frame includes also a member in the form of a tubular draw-bar 5, having an eye 6 formed at its free end. The draw-bar 5 is coupled to the frame beam 1 through the intermediary of a vertical pivot pin 7, which is passed through holes formed in the bifurcated end 5B of the draw-bar 5 and through a hole in a lug 1A fastened to the frame beam 1. A lug 8, formed with a hole, is welded to the draw-bar 5, and a plate 10, formed with a plurality of holes 9, is welded to the frame beam 1. A rod 11 having forked ends, is secured at one end to the lug 8 with the aid of a pin 12 passing through holes formed in the forked end and through the hole in the lug 8, and the rod 11 is also secured at the other end to the plate 10 with the aid of a pin 13 passing through holes formed in the forked end, and through one of the holes 9 in the plate 10.

The frame of the implement is supported by two ground wheels 14 and 15, both of which are located in front of the row of rake wheels 4 (with respect to the intended direction of travel of the implement, which direction is indicated by the arrow F in FIGURE 1). The ground wheel 14 is freely rotatable about a horizontal axle 16 which is supported at one end of an arm 17, the other end of which is secured to the draw-bar. The arrangement is such that the distance between the pivot pin 7 and the axle 16, is approximately equal to the diameter of the ground wheel 14. The ground wheel 15 is freely rotatable about a horizontal axle 18 which is secured to a vertical shaft 20 by an arm 19. The shaft 20 is journalled in a bearing sleeve fixed to one end of the frame beam 1. The axes of the axle 18 and the shaft 20 do not intersect, so that the ground wheel 15 constitutes a caster wheel.

The implement has means for lifting the rake wheels clear of the ground and/or the crop lying thereon, and for adjusting the pressure of the rake wheels upon the ground. This lifting means includes a rod 21 extending substantially parallel to a line joining the centre of the rake wheels. The rod 21 is supported in aligned holes in brackets 22 secured to the frame beam 1 so as to extend obliquely upwardly therefrom, and the rod is arranged to be displaced longitudinally in such holes. Five arms 23 are fixed to the rod 21 and the cranks 3 are connected to respective arms by tension springs 24. A control mechanism 25 for the lifting means is arranged on the draw-bar 5 near the free end thereof. The control mechanism 25 includes a lever 26 which is turnable about the axis of a horizontal pin 26A and which is urged by a spring 29 into a registering indent of a number of indents 27 formed in an arcuate strip 28, the center of curvature of which lies on the axis of the pin 26A. The lever 26 is coupled through the intermediary of a chain 30 with an arm 31 fixed to the rod 21. The chain 30 is passed round a guide member in the form of a pulley 32 rotatably supported by a pin 32A on the draw-bar 5 so that the chain 30 is in contact with the pulley at a point substantially above the pivot pin 7 and on the axis thereof.

In operation, the implement is coupled, with the aid of the eye 6 formed in the end of the draw-bar 5, to a tractor or the like for drawing the implement over the ground. The implement is moved over the ground in the direction indicated by the arrow F, and the rake wheels 4, which are rotated by virtue of their contact with the ground and/or the crop lying thereon, can co-operate to displace the crop which they engage to the left with reference to the direction F. Thus the implement operates as a side-delivery rake, the displaced crop being formed into a windrow to the left of the implement. The operational width of the implement may be adjusted by removing the pin 13 from the hole 9 in the plate 10, and by moving the forked end of the rod 11 along the plate 10 to a new position, after which the pin 13 is replaced in a further registering hole 9. By this means, the draw-bar 5, together with the ground wheel 14, is turned horizontally about the axis of the pivot pin 7, and fixed in a new position with respect to the frame beam 1. During the movement of the draw-bar 5, the position of the lifting means, and consequently of the rake wheels 4, is not altered, since the chain 30 between the control mechanism and the lifting means, passes around the guide pulley 32 at a point located on the axis of the pivot pin 7, about which axis the draw-bar 5 turns. The ground wheel 14 is automatically at the correct position with respect to the frame beam 1 for operation of the implements, since it is secured to the draw-bar 5, and moves therewith. Thus the ground wheel 14 constitutes a steering wheel for the implement. When the implement is drawn over the ground in its new position, the caster ground wheel 15 automatically assumes its correct position in the normal manner.

Upon removing the lever 26 from an indent 27, and turning the lever forwardly about the axis of the pin 26A, the rod 21 is displaced longitudinally in the holes in the brackets 22, by virtue of the connection of the lever 26 to the rod 21, afforded by the chain 30. The arms 23 move with the rod 21, so that the springs 24 are tensioned. Thus, as the lever 26 is turned, the rake wheels are raised from the ground, the cranks turning in the bearing sleeve 2. The lever 26 may be held in a desired position by allowing it to enter an indent in the strip 28, whereafter the lever is held in position by the spring 29. The lever 26 may be operated from the driving seat of the tractor owing to its disposition near the forward end of the draw-bar 5.

In order to improve the stability and quiet running of the implement, it is desirable to weight the free end of the draw-bar 5. Such weighting may be effected by the provision of a solid portion 5A of the draw-bar.

Alternatively, the free end of the hollow draw-bar may be filled with, for example, concrete.

Referring now to FIGURES 2 and 3, there are shown a first and a second embodiment of the mounting of the ground wheel 15 on the frame of the implement. In the first embodiment, shown in FIGURE 2, the vertical shaft 20 is supported in two bearing bushes 33 and 34 located at either end of a sleeve 37. The bearing bush 33 has a collar 35 resting on the upper end of the sleeve 37, and has a generally frusto-conical portion 36 which is arranged inside the sleeve 37. A tooth 38 is formed integrally with the portion 36, and is arranged to engage in a recess 39 formed in the wall of the sleeve 37. The bearing bush 34 has a collar 40 and a generally frusto-conical portion 41 which is accommodated in the lower end of the sleeve 37. The bearing bush 34 has a tooth 42, similar to the tooth 38 of the bearing bush 33, the tooth 42 being formed integrally with the portion 41. The tooth 42 is arranged to engage in a recess 43 formed in the lower part of the wall of the sleeve 37. The vertical shaft 20 is supported in aligned holes formed axially in the bearing bushes 33 and 34. A recess 44 is formed in the collar 40 of the bearing 34. A stepped collar 45 is secured to the shaft 20 and is formed with a tooth 46 which is arranged to engage with the recess 44. The stepped collar 45 is prevented from turning around the shaft 20 by a pin 47 which is passed through holes formed in the collar 45 and the shaft 20. A spring 48 is arranged to encircle the portion of the shaft 20 projecting above the bearing bush 33, the spring 48 bearing on the collar 35 and a washer 49 secured to the shaft 20 by a pin 49A. The spring 48 urges the tooth 38 into the recess 39, and also urges into engagement the tooth 42 and the recess 43, and the tooth 46 and the recess 44.

The angular position of the ground wheel 15 with respect to the frame of the implement, is limited by the movement of the tooth 46 permitted by the recess 44. The ends of the recess 44 constitute stops 44A and 44B for the tooth 46.

Generally, the permitted variation of angular position of the ground wheel 15 with respect to the frame, is less than 180°. In the embodiment shown in FIGURE 2, this permitted variation is about 45°. The collar 40 has a second recess 50, which is adapted to receive the tooth 46.

In normal operation, the wheel 15 is allowed to deviate from the line of travel by movement of the tooth 46 in the recess 44. For transporting the implement, the frame beam 1 thereof is lifted against the action of the spring 48, and the shaft 20 is turned in the bearing bushes 33 and 34 so that the tooth 46 is arranged below the recess 50. The frame beam 1 is then lowered so that the tooth 46 is engaged in the recess 50. During transport, the implement does not generally have to negotiate such sharp bends as in operation, so that it will be sufficient to form the recess of such proportions as to allow the ground wheel to turn about the axis of the shaft 20 through an angle of about 15°.

The tooth 46 and the recesses 44 and 50 are so shaped that, if an excessive lateral force is exerted on the frame of the implement during its travel over the ground, the tooth 46 is forced out of the recess 44, or 50, in which it is engaged, so that the ground wheel 15 is then capable of turning through a greater angle than that determined by the sizes of the recesses. Thus damage to the ground wheel and/or to its bearing arrangement may be avoided.

The second embodiment of the mounting of the ground wheel 15, shown in FIGURE 3, is similar to the first embodiment shown in FIGURE 2. The various parts are therefore designated by the same reference numerals. In the second embodiment, however, the stop mechanism which restricts movement of the wheel 15 about the axis of the shaft 20, is disposed at the upper end of the sleeve 37. The bearing bush 33 is located at the lower end of the sleeve 37 and the spring 48, encircling the shaft 20, bears against this bearing bush 33 and against a washer 49B welded to the shaft 20. The operation of the ground wheel 15 shown in FIGURE 3 is similar to that described above with reference to FIGURE 2. To bring the ground wheel to the transport position, the frame beam 1 of the implement is moved downwardly against the action of the spring 48, and the shaft 20 is then turned to bring the tooth 46 to a position for engagement with the recess 50. The frame beam 1 is then released, and the tooth 46 is urged by the spring 48 into the recess 50.

If desired, a plurality of holes may be formed one above the other in the shaft 20, so that the stepped collar 45 may be fixed by the pin 47 in any one of a number of positions relative to the shaft 20. Thus the vertical position of the ground wheel 15 with respect to the frame, may be adjusted.

It will be appreciated that the arrangements described above with reference to FIGURES 2 and 3, may be usefully employed in other forms of agricultural implements normally having caster wheels.

What I claim is:

1. An implement of the kind set forth, comprising a frame and a row of rake wheels wherein the frame includes a first frame member on which the rake wheels of the row are mounted, and having a second frame member in the form of a draw-bar, first and second ground wheels supporting said frame, said first ground wheel being mounted adjacent said row of rake wheels on the draw-bar so as to be movable horizontally therewith, said first ground wheel having a shaft rigid with said draw-bar, and means connecting said draw-bar and said first frame member for adjusting the position of the draw-bar and said first ground wheel as an entity with relation to said first frame member.

2. An implement as claimed in claim 1, wherein the draw-bar is arranged to be turnable about a vertical or substantially vertical axis, with respect to said first frame member, said first ground wheel being located at a fixed distance from said axis.

3. An implement as claimed in claim 2, wherein said first ground wheel is located forwardly of said axis, with reference to the intended direction of travel of the implement.

4. An implement as claimed in claim 1, wherein said second ground wheel is located forwardly of said first ground wheel, with reference to the intended direction of travel of the implement, said second ground wheel being a caster wheel.

5. An implement as claimed in claim 1, wherein said second ground wheel is ararnged on the first frame member near the forward end of the row of rake wheels, with reference to the intended direction of travel of the implement.

6. An implement as claimed in claim 1, wherein the ground wheels are located on the front side of the row of rake wheels, with reference to the intended direction of travel of the implement.

7. An implement as claimed in claim 1, wherein the free end of the draw-bar is weighted.

8. An implement of the kind set forth, comprising a frame and a row of rake wheels, wherein the frame includes a first frame member on which the rake wheels of the row are mounted, and a second frame member in the form of a draw-bar connected to said first frame member so as to be movable about a vertical or substantially vertical axis, and to be fixable in a number of positions, with respect to said first frame member, and lifting means on said first frame member for lifting the rake wheels, a control mechanism for such lifting means being mounted on the draw-bar, a coupling element, the control mechanism being connected to the lifting means by said coupling element, said coupling element being guided through an angle by a guide member located near said axis.

9. An implement as claimed in claim 8, wherein the coupling element and the guide member are in contact with each other at a point located on said axis.

10. An implement as claimed in claim 8, wherein the lifting means includes a rod which extends parallel or substantially parallel to a line joining the centers of the rake wheels, a plurality of cranks and wherein the rake wheels are mounted on said cranks connected to said first frame member, the rod being coupled to the cranks.

11. An implement as claimed in claim 10, wherein the rod is arranged to be displaced longitudinally by the control mechanism in order to raise or lower the rake wheels.

12. The structure of claim 10 wherein said draw-bar is provided with a ground wheel located substantially adjacent the end of said draw-bar where it is connected to said first frame member.

13. The structure of claim 12 wherein said ground wheel is provided with means for rigidly mounting same on said draw-bar adjacent said rake wheels.

14. An implement of the knd set forth which comprises a frame member, a plurality of rake wheels mounted in echelon on said frame member and extending from the after side thereof, a draw-bar connected at one end to said frame member on a side opposite said rake wheels, said draw-bar including means opposite its connection to said frame member for connection to a draft means, a pair of ground wheels for supporting said implement, both of said ground wheels disposed forward of said echelon of rake wheels, one of said ground wheels interconnected to said frame member at substantially one end thereof away from the connection of said draw-bar, the other of said ground wheels received on a portion of said draw-bar extending rigidly with respect to said draw-bar and close to said draw-bar's connection to said frame member and being substantially aligned with said draw-bar's means for connection to the draft means, and means connecting said draw-bar and said frame member for adjusting the position of said draw-bar and said other ground wheel as an entity with relation to said frame member.

15. An implement according to claim 14 including lifting means for said rake wheels for lifting same free of the ground.

16. An implement according to claim 14 wherein the end of said draw-bar which includes means for connection to draft means is weighted sufficiently to stabilize implement in operation.

References Cited by the Examiner
UNITED STATES PATENTS

| | | | |
|---|---|---|---|
| 828,571 | 8/06 | Rodemeyer | 56—322 |
| 1,197,712 | 9/16 | Dain | 56—322 |
| 2,689,446 | 9/54 | Sorrels | 56—377 |
| 2,807,127 | 10/57 | van der Lely et al. | 56—377 |
| 2,861,412 | 11/58 | van der Lely et al. | 56—377 |
| 2,901,880 | 9/59 | van der Lely et al. | 56—377 |
| 2,975,583 | 3/61 | van der Lely et al. | 56—377 |
| 2,993,325 | 7/61 | van der Lely et al. | 56—377 |

T. GRAHAM CRAVER, *Primary Examiner.*

CARL W. ROBINSON, RUSSELL R. KINSEY,
*Examiners.*